UNITED STATES PATENT OFFICE.

WATERS DEWEES WOOD, OF PITTSBURG, PENNSYLVANIA.

METHOD OF MANUFACTURING PLANISHED SHEET-IRON.

SPECIFICATION forming part of Letters Patent No. 395,605, dated January 1, 1889.

Application filed November 15, 1888. Serial No. 290,959. No specimens.

*To all whom it may concern:*

Be it known that I, WATERS DEWEES WOOD, a citizen of the United States, residing at Pittsburg, in the county of Allegheny and State of Pennsylvania, have invented or discovered certain new and useful Improvements in the Manufacture of Planished Sheet-Iron, of which improvements the following is a specification.

The invention described herein relates to production on sheet-iron of a dark but glossy surface, which is practically free from oxidation under atmospheric or other influences incident to ordinary conditions of use.

In the practice of my invention I preferably employ refined cast-iron, and by treating such iron in accordance with methods known in the art reduce such cast-iron to blooms of a high degree of purity. These blooms are then broken down and reduced to sheets of 20 wire-gage, (more or less,) and during such reduction the metal is subjected to the operations described in Letters Patent No. 291,260, granted to me January 1, 1884, with reference to the formation of a fixed black-oxide coating on the face of each sheet, and also the formation on such coating, to as great an extent as possible, of a red-oxide surface, which will protect and preserve the coating. The sheets thus prepared are allowed to cool and are then coated with a wash consisting of pulverized carbonaceous material, red oxide of iron, and water, as described in Letters Patent above referred to, and to this wash may be added an acidulating material, as described in Letters Patent No. 300,184, dated June 10, 1884. This wash is applied with reference to the formation of an artificial red-oxide coating on top of the black oxide. The sheets thus prepared are heated and rolled as often as required to reduce them to the desired gage, and after being allowed to cool are again coated with the wash before employed, or a wash consisting of pulverized carbonaceous material and water or carbonaceous material and an oleaginous or resinous material, as described in Letters Patent No. 297,097, dated April 15, 1884. The sheets are then put up in packs, with interposed layers of pulverized charcoal, placed in closed retorts or baking-ovens, the edges of the sheets being protected by charcoal, and subjected to heating or baking operation at a high red heat for a period, say from four to ten hours, (more or less,) or until the oxides on the surface of the sheets shall have been revived or brought back to approximately the conditions of metallic iron. If desired, hydrogen or any gaseous compound of which hydrogen forms a considerable proportion—*e. g.*, natural gas—may be introduced into the retort or baking-oven during the heating or baking operation above described, for the purpose of facilitating the deoxidizing action of the charcoal, as described in Letters Patent No. 348,258, dated August 31, 1886.

After the sheets have been subjected to the above-described heating or baking operation for a sufficient length of time to revive or reconvert the oxide coating to or approximately to a metallic state, the packs are removed from the retort or oven, and while in a highly-heated condition and before they can be injuriously affected by atmospheric influences the ashes and unconsumed charcoal are quickly removed, and both surfaces of each sheet are subjected to the action of a highly-deoxidizing agent—as, for example, hydrogen, or any gaseous or other compound of which hydrogen forms a considerable part or proportion—as, for example, natural gas—for the purpose of more thoroughly and completely effecting or perfecting a revivification or reconversion of the oxide coating to metallic iron. After this final and complete deoxidation, and before any injurious effects are produced by atmospheric influences and any material cooling or chilling action can occur, the sheets are subjected to an oxidizing agent for the purpose of forming a black or magnetic oxide on the surface of the sheets. Immediately after this oxidation and before the internal heat of the sheets or atmospheric influences can act to "raise" or loosen the oxide so formed all further deleterious chemical action is stopped by the application to the sheets of some cooling or chilling agent. The sheets are then hammered or rolled to remove any irregularities, and are then matched up, heated to a low red heat, and then hammered thoroughly by planishing-hammers in the manner well known in the art.

In effecting the operations above described subsequent to the heating or baking operations various mechanical devices can be employed, and in so far as such devices may contain patentable features they are reserved as the subject-matter of applications to be filed in due time; but in order to render the present case more clear I will briefly describe one way in which such operations can be effected. The hydrogen or its compounds, under considerable pressure, is caused to play in jets or streams on the surfaces of the sheets at such an angle thereto as to blow off the waste material thereon and at the same time subject all parts of the surface of the sheets to such intimate contact with the hydrogen that any part thereof which may not have been deoxidized or only partially so during the previous operations will be thoroughly revived or converted; and, further, the application of the hydrogen at this stage of the operation surrounds the sheets with a protecting or non-oxidizing atmosphere, which will preserve the sheets to a greater or less extent from injurious effects until the oxidizing agent can be applied.

The oxidizing and chilling operations are produced by the application of steam and cold water, as described in Patent No. 291,260, hereinbefore referred to.

Although I have described with considerable particularity the preferred method of preparing and treating the sheets prior to the application thereto of the deoxidizing-gas at the end of the baking or heating operation, I do not wish to limit myself to such method, as good results can be obtained by preparing the sheets for the application of the deoxidizing-gas in the manner set forth in prior Letters Patent, other than those recited, granted to me for the manufacture of planished sheet-iron.

I claim herein as my invention—

1. As a step in the method of manufacturing planished sheet-iron, applying to the sheet a deoxidizing-gas intermediate between the withdrawal of the sheet from the preliminary deoxidizing operation and the application thereto of an oxidizing agent, substantially as set forth.

2. As a step in the method of manufacturing planished sheet-iron, applying hydrogen or other gas containing a considerable proportion of hydrogen to the surfaces of the sheet intermediate between the preliminary deoxidizing operation and the application thereto of an oxidizing agent, substantially as set forth.

In testimony whereof I have hereunto set my hand.

WATERS DEWEES WOOD.

Witnesses:
DARWIN S. WOLCOTT,
W. B. CORWIN.